United States Patent
Smirnov et al.

(10) Patent No.: US 8,738,721 B1
(45) Date of Patent: May 27, 2014

(54) SYSTEM AND METHOD FOR DETECTING SPAM USING CLUSTERING AND RATING OF E-MAILS

(71) Applicant: Kaspersky Lab ZAO, Moscow (RU)

(72) Inventors: Evgeny P. Smirnov, Moscow (RU); Andrey V. Bakhmutov, Moscow (RU); Sarya V. Loseva, Moscow (RU); Dmitry A. Shvyrkov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/069,472

(22) Filed: Nov. 1, 2013

(30) Foreign Application Priority Data

Jun. 6, 2013 (RU) ................................ 2013125976

(51) Int. Cl.
*G06F 15/16* (2006.01)

(52) U.S. Cl.
USPC ........................................................ 709/206

(58) Field of Classification Search
USPC ........................................................ 709/206
See application file for complete search history.

(56) References Cited

U.S. PATENT DOCUMENTS

| | | | |
|---|---|---|---|
| 7,925,707 B2 * | 4/2011 | Wilson et al. | 709/206 |
| 8,037,535 B2 | 10/2011 | Maloof | |
| 8,256,000 B1 | 8/2012 | Krishnappa | |
| 8,312,546 B2 | 11/2012 | Alme | |
| 8,316,094 B1 * | 11/2012 | Cooley | 709/206 |
| 2010/0191819 A1 * | 7/2010 | Alspector et al. | 709/206 |
| 2011/0083187 A1 | 4/2011 | Malanov | |
| 2011/0239294 A1 | 9/2011 | Kim et al. | |
| 2012/0030293 A1 * | 2/2012 | Bobotek | 709/206 |
| 2012/0159625 A1 | 6/2012 | Jeong et al. | |

* cited by examiner

*Primary Examiner* — Phuoc Nguyen
(74) *Attorney, Agent, or Firm* — Arent Fox LLP; Michael Fainberg

(57) ABSTRACT

Disclosed are systems, methods and computer program products for detection of spam. In one example, a system receives electronic messages and attempts to classify the messages as legitimate or spam messages. For an unknown message, the system obtains its metadata including hash sum of the message and sender's IP address. The system then places the metadata of the unknown messages into one cluster of a plurality of clusters based on degree of similarity between hash sums of different unknown messages. The system then rates each unknown message in accordance with a rating of the cluster, wherein the rating of the cluster is based, at least, on a number of similar hash sums of unknown messages received from different addresses of message senders contained in said cluster. Finally, the system classifies unknown messages as legitimate or spam based on the message rating.

20 Claims, 12 Drawing Sheets

SYSTEM AND METHOD FOR DETECTING SPAM USING CLUSTERING AND RATING OF E-MAILS

CROSS-REFERENCE TO RELATED APPLICATIONS

This application claims benefit of priority under 35 U.S.C. 119(a)-(d) to a Russian Application No. 2013125976 filed on Jun. 6, 2013, which is incorporated by reference herein.

TECHNICAL FIELD

The disclosure relates generally to the field of information security, and more specifically to systems and methods for detecting spam using clustering and rating of e-mails.

BACKGROUND

Computer systems play an important role in the life of the modern man. In contemporary society, hardly anyone can say that they could easily get by without a personal computer, notebook or smart phone. Various computer systems are used at home, at the factory and in the office. A significant share of all work is done using computers.

Taking into account the full significance that computer systems have in people's lives in supporting their habitual mode of existence, the number of hackers is on the rise whose activity is devoted to creating program applications representing a threat to computer systems. One of the most widespread examples of hacker activity is organizing the sending out of spam.

Spam is an anonymous, unwanted, mass sending e-mail. A variety of spam that is recently growing in popularity is the SMS messages containing commercial and other offers that are sent without the consent of the user. As a rule, spam is of an advertising nature, and so for the most part it does not constitute a threat to the computer systems of users. The exception is spam having a harmful content. Such electronic messages containing harmful attachments can present a threat to the data present in the computer.

Nevertheless, even if the spam messages are not harmful and only bear the nature of advertising, they often present certain inconveniences. One such inconvenience is "cluttering" of the computer user's mail, when the user may easily overlook an important message in the flow of numerous spam messages. What is more, spam messages take up a substantial volume of the e-mail traffic. For example, the share of spam includes more than 70% of global mail traffic. The spam messages accumulate in user mail boxes and take time to clean out. One should also consider that among the spam messages there are messages which lead to phishing resources that can be a cause of theft of passwords and personal data.

Present methods of spam detection, which typically involve grouping of messages by various criteria, often result in false positives, i.e., when the spam message ends up in the group of legitimate messages or when the legitimate message is grouped as spam.

Therefore, there is a need for spam detection method that minimizes the number of false positives and consequently maximizes the degree of protection against spam.

SUMMARY

Disclosed are systems, methods and computer program products for detection of spam. In one example aspect, a computer system receives a plurality of electronic messages. The system attempts to classify the received plurality of messages as legitimate or spam messages. The system then identifies unknown messages that could not be classified as legitimate or spam. The system obtains a metadata of the unknown messages. The metadata may include at least a hash sum for an unknown message and an IP address of a sender of the unknown message. The system then places the metadata of the unknown messages into one cluster of a plurality of clusters based on degree of similarity between hash sums of different unknown messages. The system then rates each unknown message in accordance with a rating of the cluster where the metadata of the unknown messages was placed to, wherein the rating of the cluster is based, at least, on a number of similar hash sums of unknown messages received from different IP addresses of message senders contained in said cluster. Finally, the system classifies unknown messages as legitimate or spam based on message ratings.

In one example aspect, the classification of unknown messages may further include classifying a message as spam when its cluster rating is above a first threshold, and classifying a message as legitimate when its cluster rating is below a second threshold. Yet in another aspect, when the cluster rating is between the first and second thresholds, the system may quarantine the messages in said cluster for a period of time or until cluster rating changes above the first threshold or below the second threshold.

In one example aspect, the greater is the number of messages in a cluster with similar hash sums and different addresses of message senders, the rating of a cluster indicates that the cluster contains metadata of spam messages, and the greater is the number of messages in a cluster with similar hash sums and the same address of the message sender, the rating of said cluster indicates that the cluster contains metadata of legitimate messages.

In one example aspect, the system may receive the plurality of messages from one or more message traps; and when a message is received from a message trap, the system may modify the rating of a cluster to which said message was assigned to indicate that the cluster contains metadata of spam messages.

In one example aspect, the system may place the metadata of the unknown messages into a plurality of clusters using a cluster tree, in which each node of the cluster tree identifies hash sums common to a plurality of legitimate messages or spam messages.

In one example aspect, the system may obtain a metadata of the unknown messages by separating each unknown message into a plurality of fragments, computing hash sums of each of the plurality of message fragments, identifying one or more hash sums of message fragments common to a plurality of message, and filtering the metadata by removing hash sums of the message fragments common to a plurality of messages.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects of the present invention are described herein in the context of systems, methods and computer program products for detecting spam using clustering and rating of e-mails. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
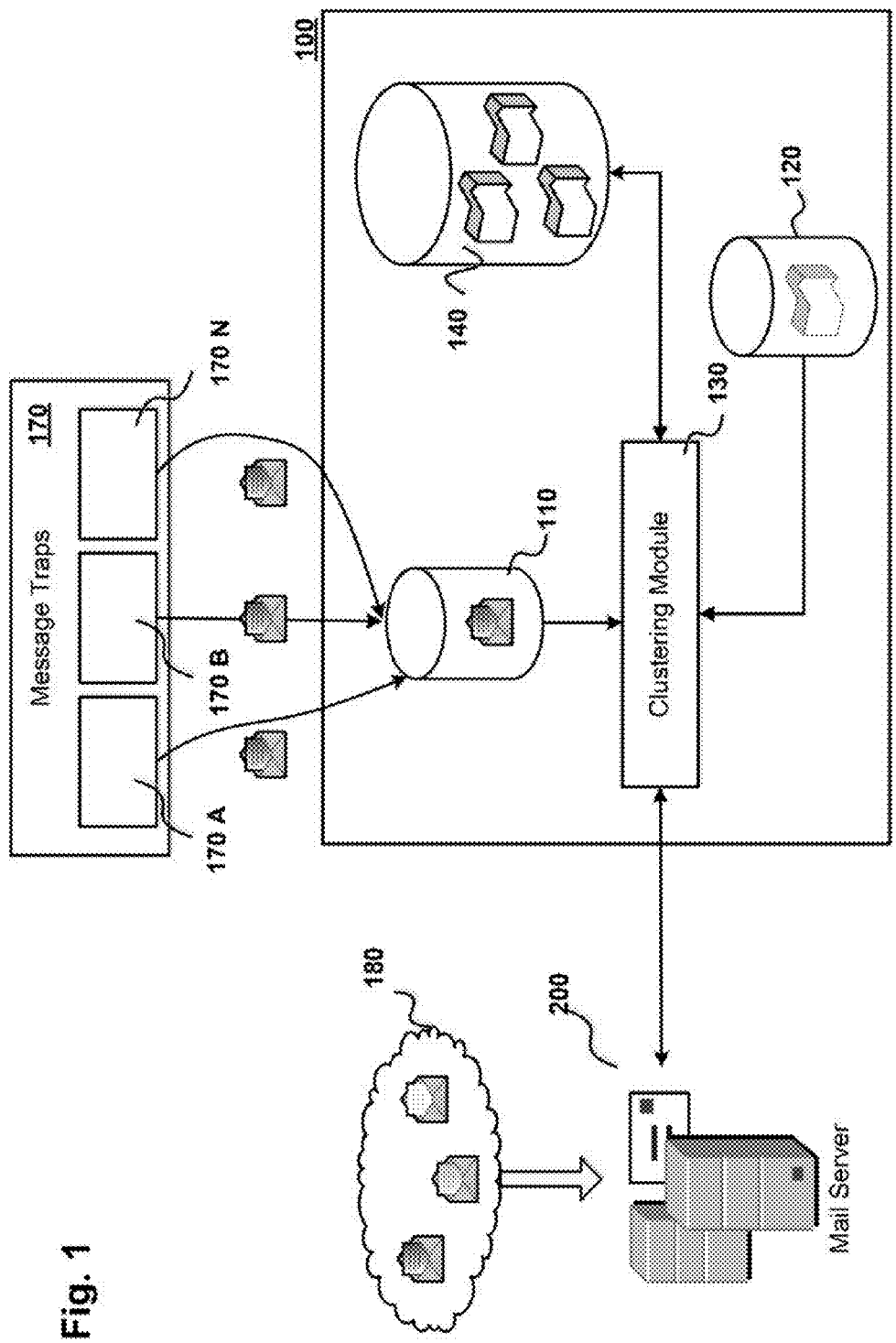
FIG. 1 is a block diagram illustrating a layout of network architecture used for classification of electronic messages in accordance with aspects of the present invention.

FIG. 1 shows a layout of a network architecture used in classification of e-mail messages as spam or legitimate using clustering and ratings of messages. In one aspect, the architecture includes a rating determination system 100 that performs rating and clustering of metadata of received electronic message (also referred herein as e-mail messages or e-mails). The message metadata may include the minimum information about the message that may be used by the system 100 for an unambiguous identification of the message and its sender. In one aspect, the metadata includes, at least, the set of one or more hash sums of the received message and the IP address of the sender of the message. The hash sums characterize the content of the message. The IP address provides information about message sender. This set of information is generally sufficient to classify each message as spam or legitimate.

In one example aspect, the rating determination system 100 may use message metadata to classify the message as spam or as legitimate by determining if the messages have a similar content. For example, if a group of messages have similar hash sums, but were sent from a many different IP addresses, then these messages may be classified as spam; however, if the messages with similar content come from the same IP address, then these messages may be classified as legitimate. In one aspect, the number of IP addresses can be specified as a relative expression from the total number of IP addresses for a particular mailing.

In one example aspect, the rating determination system 100 may also perform clustering of received message into different clusters in order to classify the messages as spam or legitimate. Clustering involves placing a metadata of a received message into a cluster of messages. The term "placing" as used herein includes not only physically placing a metadata into a memory location associated with a particular cluster, but also includes assigning and/or associating, using pointers for example, the metadata with a particular cluster. The terms placing, assigning and associating a message with a cluster will be used interchangeably herein.

In one example aspect, the rating determination system 100 may also determine the rating of a cluster which can be used in classification of messages assigned to that cluster as spam or legitimate. The cluster rating in one aspect may be a numerical value, which can vary in an established range, and it serves as a criterion for determining the category of messages whose metadata is found in the cluster. The cluster rating is formulated and changed in the course of the filling of the clusters with the metadata of the messages, and also after restructuring the cluster index tree (hereinafter "the cluster tree"). The process of formulation and changing of the ratings of clusters will be discussed in greater detail below.

In one aspect, the rating determination system 100 receives messages from different sources. One of such sources is message traps 170, which serve to capture spam messages. The message traps may include, but not limited to, abandoned domain names, wherein the messages arriving at the abandoned domains will be forwarded to the system 100. In one example aspect, message traps 170 may include a plurality of different mail boxes 170A . . . 170N, having different electronic addresses, which are used to collect various mailings of spam e-mails. To provide the streams of incoming messages, the electronic addresses of the traps are deliberately disseminated on those resources from which spam senders can potentially get mail addresses for future spam mailings. For example, address data can be left deliberately during registration on various pornography sites, Internet magazines having low reputation, social networks, subject forums, and so on. In time, various mailings will begin to arrive to the trap mail boxes 170A-170N and will be rerouted to the rating determination system 100 and saved in the spam message storage module 110. The longer the message trap exists, the greater the quantity of different messages it will be able to gather. This is primarily due to the fact that the address of the trap is sent to other unscrupulous Internet resources that distribute spam messages, and also to hackers who deliberately organize spam mailings.

In various aspects, the rating determination system 100, in addition to, or instead of, the message traps 170, may interact with one or more client mail servers 200, which will be described in greater detail below with reference to FIG. 2. The client mail server 200 may include modules necessary to conduct an analysis of the messages and interact with the rating determination system 100. For example, the mail server 200 receives various electronic messages 180 and, immediately upon receipt, may analyze these messages to determine whether they are spam, legitimate or unknown. The spam messages may be processed according to rules set by the administrator, for example, such messages may be removed or quarantined. In one aspect, the mail server 200 may forward the unknown messages (and spam messages) to the rating determination system 100 for further analysis and classification.

In one example aspect, the rating determination system may use unknown messages and spam messages in the clustering process. The system 100 may receive messages from traps 170 and server 200, save the received messages in message database 110, and use clustering module 130 to place messages in appropriate clusters (i.e., clustering process). In another aspect, the client mail server 200 may directly process the spam messages, create metadata for these messages and sent the metadata to the rating determination system 100, where the metadata is assigned to one cluster or another by the clustering module 130.

The unknown messages may include both spam and legitimate messages. In order to classify the unknown messages, they are subjected to additional processing by the rating determination system 100 and/or mail server 200. The processing may be performed in several stages: At first, metadata may be generated for unknown messages by, for example, the metadata processing module 240 of the client mail server 200. After this, the metadata is dispatched to the clustering module 130 of the rating determination system 100. The clustering module 130 of system 100 performs clustering process and sends results of clustering to the mail server 200. The decision making module 260 on the client mail server 200 uses received clustering results to determine whether the message is spam or not.

Figure 3:
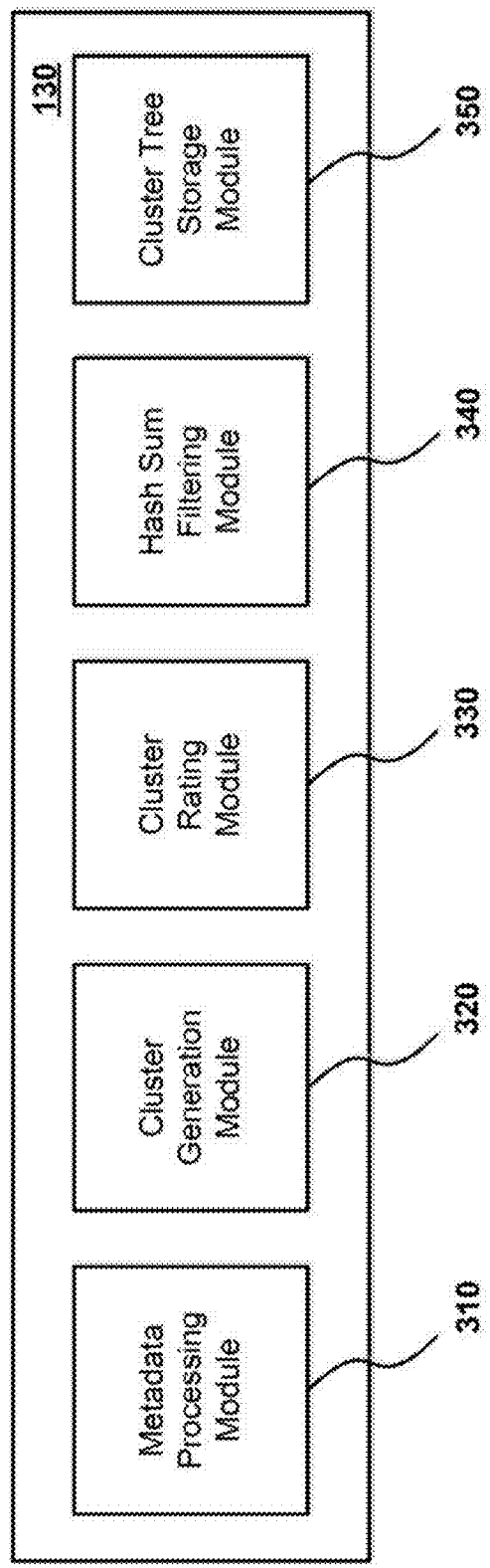
FIG. 3 is a block diagram illustrating a structure of the clustering module of the system for rating determination in accordance with aspects of the present invention.

FIG. 3 shows one example configuration of the clustering module 130 of the rating determination system 100. In one example aspect, the clustering module 130 includes metadata processing module 310 configured to create a set of hash sums for the messages, and also to obtain the IP addresses of the senders. A large number of algorithms exists for the calculating of hash sums, but in one aspect of the invention, the algorithm should ensure the fulfillment of certain requirements for the hash sums being created. In particular, the hash sums should be created such that, when a set of hash sums is created for another message that differs slightly from the first, both sets of hash sums have a high degree of similarity, that is, the number of matching hash sums in the two sets should be greater than an established threshold. This rule should be fulfilled to ensure the possibility of determining messages that are close in content with slight differences, including those introduced deliberately by hackers to prevent the detection of the message with the use of precise templates.

On the other hand, the hash sums should not be constructed such that two different messages have a high number of matching hash sums. In such a case, there is a high probability of error, when different messages are placed in the same cluster, whereupon spam messages could be confused with legitimate messages when they end up in the same common cluster. One example process of generation of hash sums will be discussed in greater detail below in the context of describing the scheme for generation of metadata shown in FIG. 8.

In one example aspect, the clustering module 130 may further include a hash sum filtering module 340 whose task is to determine which hash sums should be filtered out before the clustering process is carried out. Such hash sums may be stored in the signature hash sum storage module 120 of the rating determination system 100. Performing the preliminary filtering of the sets of hash sums produced by the module 310 allows removal those hash sums which might influence the occurrence of false positives, such as for example hash sums of message signatures. The signature in a message may contain the name of the sender, the name of a company, a link to a web page, and other identifying information of the sender. Since the signature as a rule is added to the message automatically, all messages from the same sender or group of senders will have identical signatures which, if left unfiltered, will be included in the process of forming the hash sums and the subsequent clustering. Thus, the degree of similarity of messages having similar signatures will be greater, regardless of the message content. This circumstance may afterwards mean that a mailing consisting of legitimate messages with similar signatures will be classified as spam based on the results of analysis of clusters, since it will have a mass appearance and arrive from different senders. To avoid such situations, the module 340 may filter out hash sums that detract from the information content useful for analysis in the set of hash sums obtained for the message.

The information obtained after the processing of hash sums of the messages may be stored in clusters contained the cluster storage module 140. The clusters are generated by the module 320 of the clustering module 130. In addition to hash sums, the storage module 140 contains the IP addresses of the senders of the corresponding messages. The IP addresses may be ascertained by the metadata processing module 310 of clustering module 130. In addition, other types of information characterizing messages may be generated and stored in clusters.

In order to determine whether a set of hash sums characterizing a message belongs to a particular cluster, the rating determination system 100 may construct a cluster index tree in accordance with one example aspect. Particularly, the cluster tree may be generated by the cluster generation module 320 and stored in the cluster tree storage module 350. At the same time, the clusters themselves in the form of complete sets of hash sums and IP addresses may be stored in the storage module 140. When new metadata about unknown message becomes available, the module 320 determines the appropriate cluster and saves the metadata in that cluster in the storage module 140. After adding the new hash sums, the cluster tree can be restructured by the module 320. The mechanism of forming and restructuring the cluster tree will be discussed in more detail below with reference to FIGS. 9 and 10.

Finally, the rating determination system 100 also includes a cluster rating module 330 that determines the ratings of the clusters. The rating of a cluster allows classification of messages associate with that cluster as spam or legitimate. Therefore, after determining the cluster that a message belongs to, the rating of that cluster may be assigned to all messages associated with that cluster. The cluster ratings may change when new metadata is added to the cluster. The main criterion used to form the cluster rating is a counting the number of similar sets of hash sums with different IP addresses of senders. The more similar sets of hash sums received from different senders contained in a cluster, the greater the likelihood that the given cluster contains hash sums pertaining to spam messages, and the rating of the cluster will increase. A large number of similar hash sums pertaining to a message sent from the same IP address will mean that said message is not classified as spam message, which manifests itself in a lowering of the cluster rating. In the process of changing the cluster ratings, one may also take account of the sources from which messages or metadata of messages were received. For example, when clustering messages received from message traps 170, the rating of the cluster to which the metadata of the messages will be assigned will be increased to indicate spam.

Figure 2:
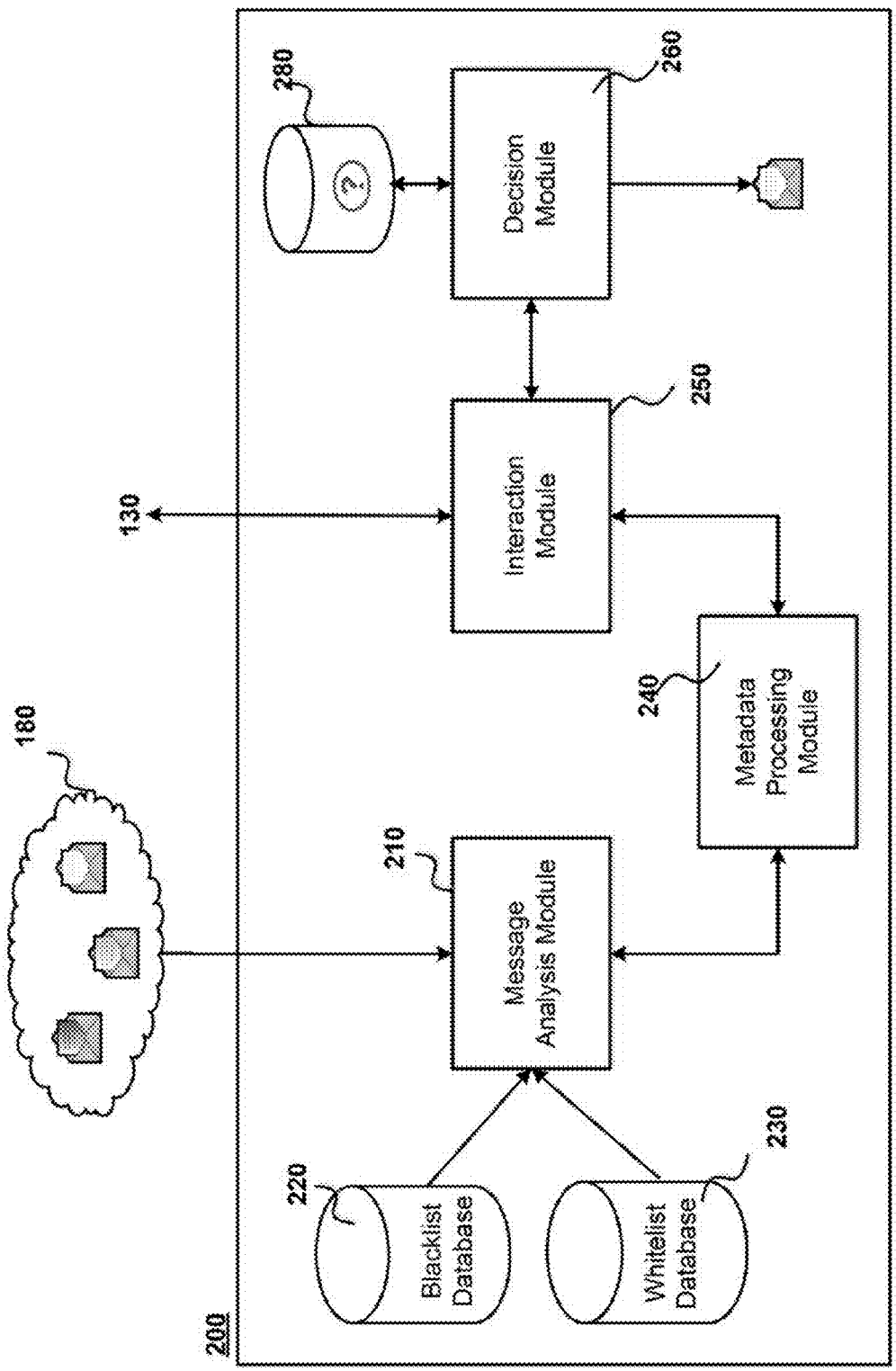
FIG. 2 is a block diagram illustrating a part of the layout of a client mail server in accordance with aspects of the present invention.

FIG. 2 shows a diagram of the system for processing of incoming messages on a client mail server 200. The messages 180 arriving at the server 200 may generally be addressed to different users who have e-mail addresses registered on the server 200. The incoming message 180 are processed by the message analysis module 210, which uses blacklist database 220 and whitelist database 230 to classify the incoming messages 180 as spam or legitimate. In one example aspect, the white list 230 may contain known legitimate IP addresses. Messages 180 received from these addresses may be considered legitimate and may be forward to the recipient's mail box on server 200. In one example aspect, the black list 220 may contain known prohibited IP addresses. Message 180 received from these addresses may be considered spam and may be automatically deleted, quarantined, or placed in dedicated spam folders. In addition, lists 220 and 230 may contain checksums of the messages, characteristic words and other information used by the analysis module 210 in classifying messages 180.

After the preliminary processing by the analysis module 210, all incoming messages 180 may be divided into three groups: legitimate messages, spam messages, and unknown messages, which have not been assigned to either of the first or second group. The messages are handled differently afterwards, depending on the group to which they have been assigned.

The spam messages can be handled in various ways in different implementations of the system. In one aspect, the spam messages may be used in the clustering process. The messages may be transferred to the rating determination system 100, stored in the storage module 110, and then placed in an appropriate cluster by the clustering module 130. In another aspect, the spam messages can be processed directly on the client mail server 200 to generate message metadata and transfer the metadata to the rating determination system 100, where the metadata is placed in the appropriate cluster by the clustering module 130.

The process of clustering of the spam messages makes it possible, using the rating determination system 100, to determine, by using part of a mailing of spam messages detected by standard detection mechanisms, such as black and white lists, another part of the same mailing of spam messages that cannot be detected by standard detection mechanisms. For example, if the message analysis module 210, having detected several identical spam messages, does not detect a similar, but slightly altered spam message, then this message will be detected with the help of the rating determination system 100. In this process, the metadata of the spam messages detected by standard module and afterwards clustered will be needed to detect similar spam messages with the help of the rating determination system 100.

When the message analysis module 210 cannot reliably determine using standard detection mechanisms whether a message is legitimate or spam, the message may be given an intermediate status of an unknown message. In one aspect, unknown messages may undergo additional analysis by the rating determination system 100, and the messages may be classified as spam or legitimate based on the results of the additional analysis by the system 100.

In one example aspect, after preliminary processing by the message analysis module 210, unknown messages may be sent to the metadata processing module 240, which generates metadata for the unknown messages. The metadata is transferred by the interaction module 250 to the clustering module 130 of the rating determination system 100. The clustering module 130 analyzes the metadata and determines the cluster to which it belongs, and then determines the cluster rating, which is sent back as a response to the client mail server 200. If the cluster rating falls in the region between high and low thresholds, specified in the decision making module 260, then the decision making module 260 may send the message to the quarantine module 280, where the message stays for an predetermined period of time, during which the message awaits a change in the rating of the cluster to which it belongs. At the end of this time period, the quarantined message may be subjected to another check. In one example aspect, the system may be implemented such that the message is checked again several times in the course of the quarantine interval. The time spent in quarantine can also be computed from the results of the working of the rating determination system 100, for example, it can depend on the speed of filling of the clusters. It should be noted that one message may not be placed in quarantine twice. After finishing the time spent in quarantine, if the message is not deemed to be spam, it is forwarded to the recipient.

Figure 4:
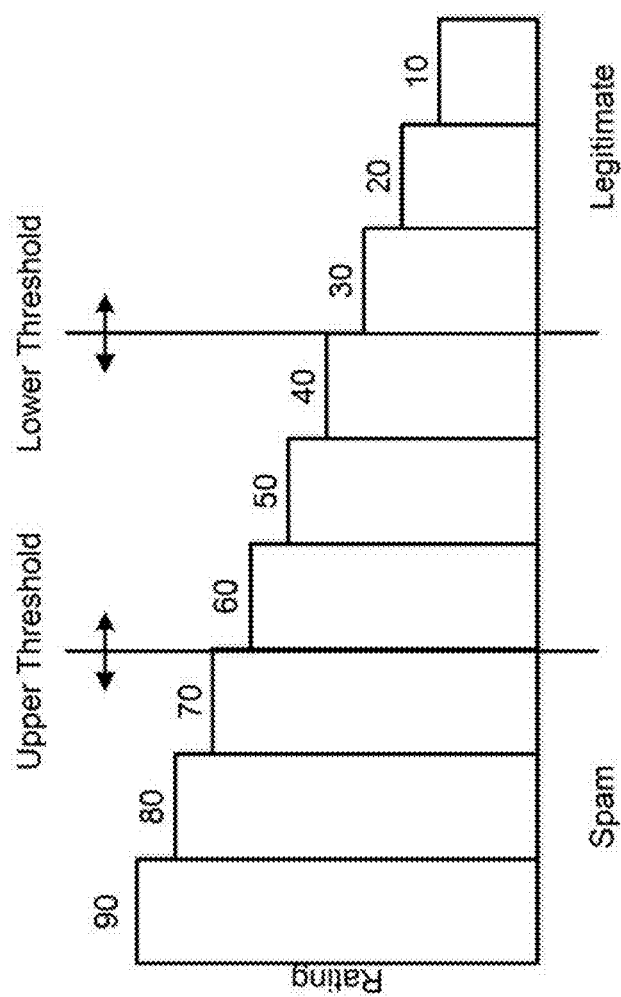
FIG. 4 is a block diagram illustrating an example of the representation of message ratings and thresholds in accordance with aspects of the present invention.

After obtaining a response from the clustering module 130 in the form of a cluster rating, which is the rating that characterizes all messages associated with this cluster, the interaction module 250 sends the message rating to the decision making module 260, which uses specified values of an upper and lower thresholds to determine whether the message is spam or not. Example threshold values of message rating are shown in FIG. 4. These values may be changed automatically after analysis of results of message filtering or they may be changed manually by the administrator in order to tighten or loosen spam detection criteria. If the message rating does not exceed the lower threshold value, the message may be classified as legitimate and forwarded to the recipient. If message rating exceeds the upper threshold, the message may be classified as spam, and handled according to the server policies for spam.

Figure 5:
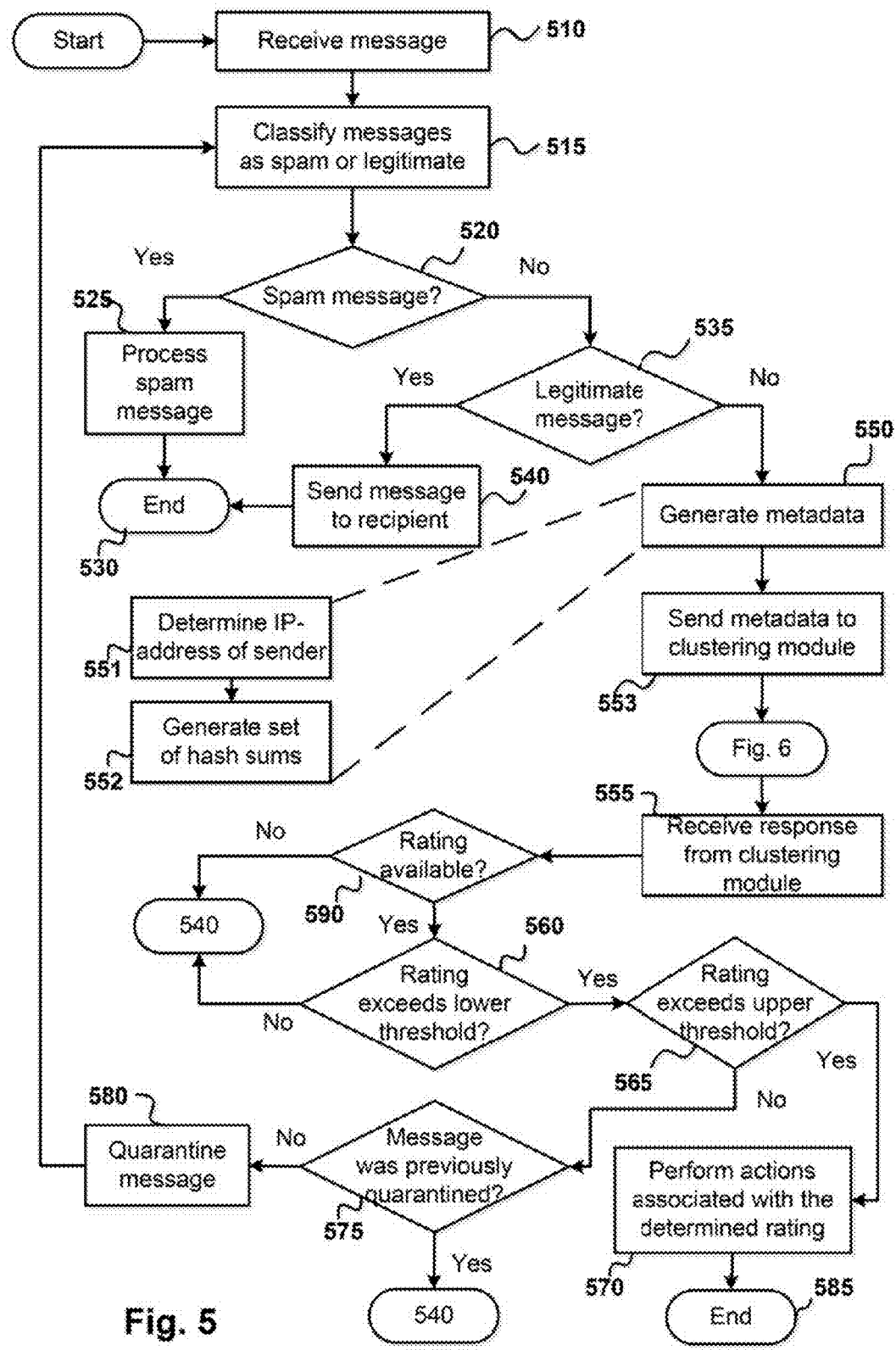
FIG. 5 is a flow diagram illustrating an example method for processing of incoming electronic messages in accordance with aspects of the present invention.

FIG. 5 shows an example method for processing of incoming messages by the client mail server 200. The algorithm starts at step 510, in which the client mail server 200 receives a message 180. At step 515, the message analysis module 210 performs preliminary analysis of received message to classify the message as spam, legitimate or unknown. When performing the preliminary analysis, the module 210 may use standard mechanisms of spam detection, involving for example checking the message against black and white lists 220 and 230, respectively. If at step 520 the analysis results determine that the message is spam, this message is processed in step 525 in accordance with the server rules for handling of spam messages. The message may then be transferred to the rating determination system 100, stored in the storage 110, and then assigned to a cluster by the clustering module 130.

In another aspect, the spam messages can be processed directly on the client mail server 200, metadata can be prepared for the messages and transferred to the rating determination system 100, and the clustering module 130 will assign them to one cluster or another. After this, the work at the client mail server ends at step 530.

If it is established at step 520 that the received message is not spam, then in step 535 a message analysis module 210 may perform a check, using for example white list database 230, whether the message is legitimate. Legitimate messages may be forwarded to the recipient's mail box at step 540, after which the algorithm ends at step 530.

In another aspect, if the message cannot be classified as either spam or legitimate, it is designated as unknown and sent to module 240, which generates metadata of the message, at step 550. In order to generate the metadata, the IP address of the sender of the message is identified and a set of hash sums is constructed in step 551 and 552, respectively. The metadata should contains information that identifies the message, but does not give access to the content of the message itself and, that cannot be used to reconstruct the message contents, so that the content of the message remains confidential and accessible only to the designated recipient. At step 553, the metadata may be transfer to the clustering module 130 of the rating determination system 100, which performs additional processing described in greater detail below with reference to FIG. 6. At step 555, the interaction module 250 of the server 100 receives from the clustering module 130 a reply which may or may not include a message rating. The rating may be unavailable if the message metadata was not assigned to any of the existing clusters, and a new cluster was created for it. If the rating is unavailable, at step 590, the message may still be forwarded to the recipient at step 540.

If it is determined in step 590 that the message rating has been obtained, then at steps 560 and 565, the decision making module 260 compares the received rating with the upper and lower thresholds. If the rating does not exceed the lower threshold, then the message may be classified as legitimate and forwarded to the recipient. If the rating exceeds the upper threshold, then the message is classified as spam, and the necessary actions are performed for this message in step 570, for example, those set forth by the rules for processing spam messages, as previously described. After this, the algorithm ends at step 585.

In the event that the rating is between the lower and upper threshold and it is established at step 575 that the message has not been previously quarantined, the decision making module 260 may place the message in the quarantine storage module 280 at step 580. The message is placed in quarantine for a specified period of time, upon expiration of which the message is transferred for a repeat check in step 515. In another aspect, the message may be checked several times in the course of quarantine. Repeated checking after a specified time is necessary because in this time the settings for the message analysis module 210 may have changed at the client mail server 200 and, most importantly, the rating for the given message may have changed in the rating determination system 100. In one example aspect, the system can be configured so that only the rating for a message in quarantine will be checked again.

In one aspect, the client mail server 200 can be set up such that an optimal time that an unknown message spends in quarantine is sufficient for a changing of the message rating by the rating determination system 100, and, at the same time, not inconveniencing the recipient due to unduly delay in receiving unknown messages. Thus, by placing messages in quarantine, it becomes possible to reduce the number of false positives in the determination of spam messages if it was not possible in the beginning to classify that message as spam or legitimate. Furthermore, in another example aspect, the message placed in quarantine ones should not be quarantined again. Therefore, upon repeat analysis of the message, if it is not assigned by the analysis module 210 as being spam, then it is forwarded to the recipient at step 540, even if the rating for the message is between the upper and lower thresholds.

Figure 6:
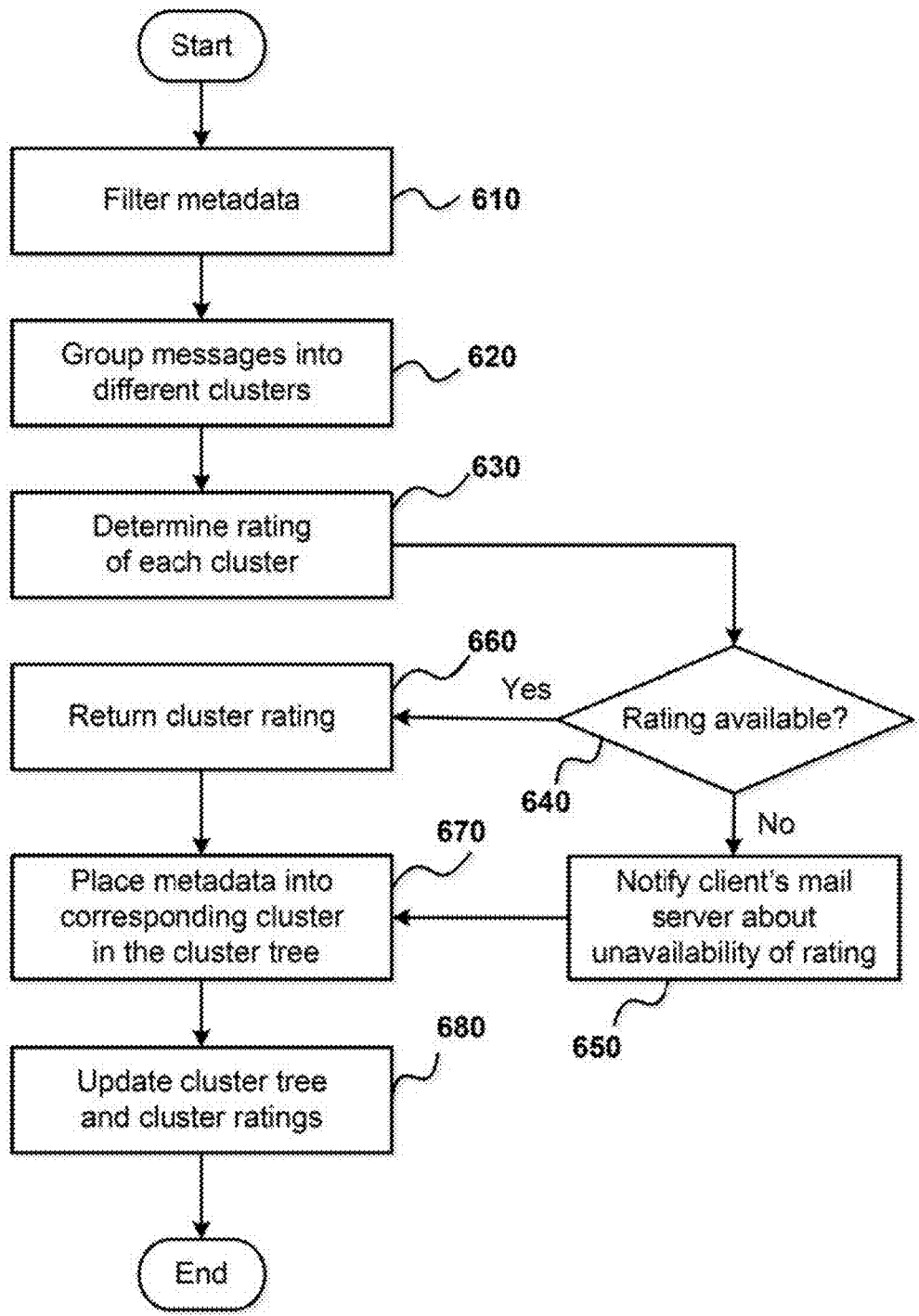
FIG. 6 is a flow diagram illustrating an example method for determining the ratings of electronic messages in accordance with aspects of the present invention.

FIG. 6 illustrates an example method for determining the rating of electronic messages performed by the rating determination system 100. As noted above, to determine the rating of a message, the clustering module 130 receives metadata of the message from the interaction module 250. After receiving the message metadata, the hash sum filtering module 340, which is part of the clustering module 130, performs in step 610 a filtering of the hash sums received, making use of the storage 120. Upon completion of the filtering process, in step 620, the cluster generation module 320 searches in the cluster tree storage module 350 for a cluster to which the metadata may be assigned. When a suitable cluster is identified, in step 630, the rating of the cluster is determined by the cluster rating module 330, and then a check is made as to the availability of the rating at step 640. A cluster rating may be unavailable due to an insufficient number of metadata sets in the cluster. If it is determined in step 640 that the cluster rating is unavailable, then the client mail server 200 is notified that the rating for the message is unavailable at step 650. If the rating is available, then the rating of the cluster to which the metadata was previously assigned is dispatched as a reply by the clustering module 130 to the interaction module 250 of the client mail server 200 in step 660. The metadata of the message is placed in the corresponding cluster in the cluster storage module 140 in step 670, after which the cluster tree and the corresponding ratings are updated in step 680. It should be noted that, to relieve the computational burden, the updating and restructuring of the cluster tree contained in the cluster tree storage module 350 by the module 320 on the basis of metadata from the storage module 140 and the updating of the cluster ratings by the module 330 can be done not after each inquiry, but periodically, after specified intervals of time, or when an established number of inquiries are received from the client mail server 200.

Figure 7:
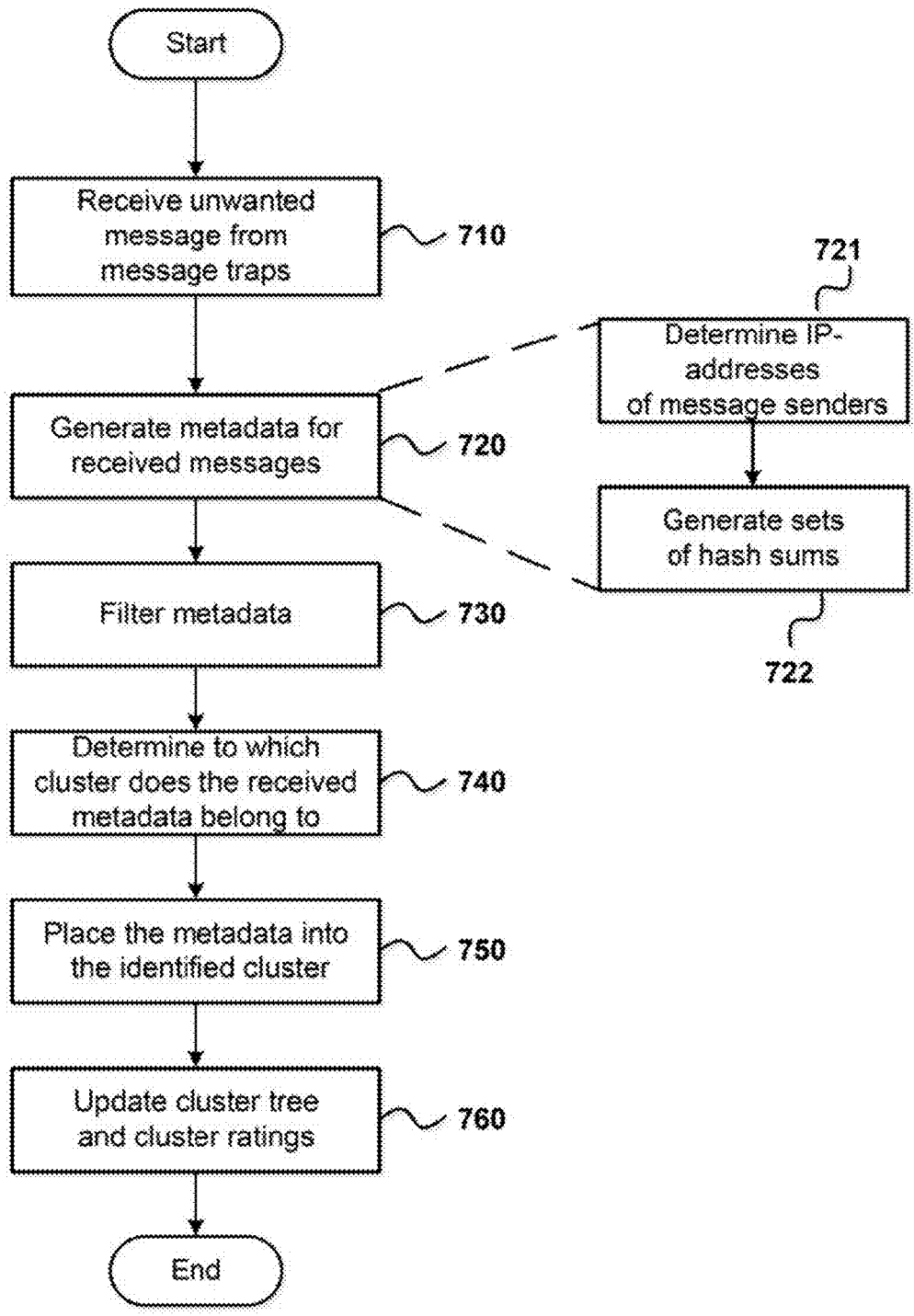
FIG. 7 is a flow diagram illustrating an example method for processing of spam incoming messages from message traps in accordance with aspects of the present invention.

FIG. 7 illustrates an example method for processing of spam messages received from message traps 170. After receiving spam messages from traps, at step 710, the messages may be stored in the storage 110, and the clustering module in step 720 may create metadata for the received messages. The process of generation of metadata includes step 721 of determining IP address of the sender of the message and step 722 of constructing the set of hash sums for the message. At step 730, the process of filtering of the metadata is performed by removing signatures from the sets of hash sums using the storage 120. Upon completing the filtering, at step 740, the cluster generation module 320 searches for the cluster to which the received metadata should be assigned in the cluster tree storage module 350. After this, the metadata is placed in the identified cluster in the cluster storage module 140 at step 750. Finally, at step 760, the cluster tree and the corresponding cluster ratings are updated.

Figure 8:
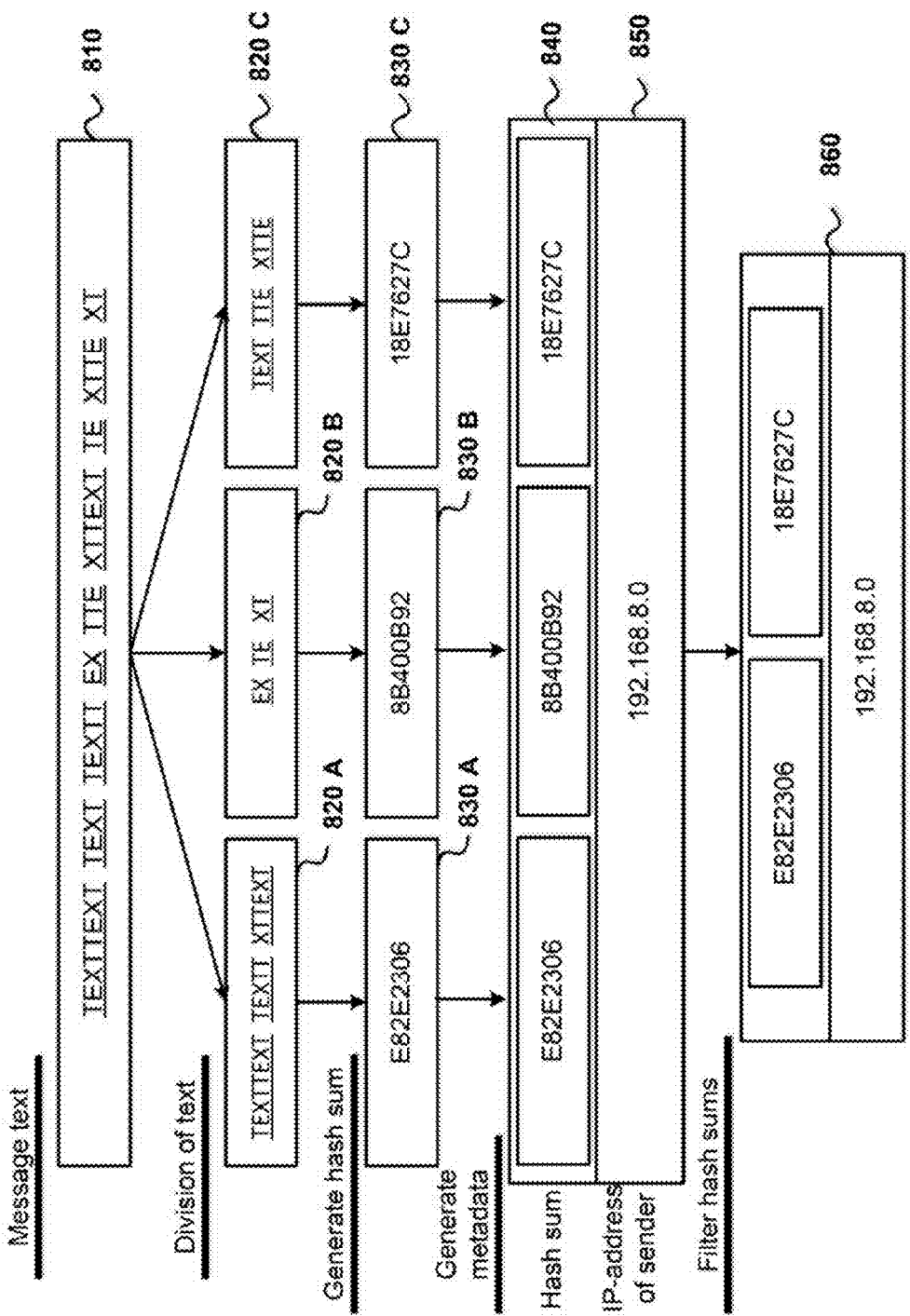
FIG. 8 is a schematic diagram illustrating the process of generation of metadata of electronic messages in accordance with aspects of the present invention.

FIG. 8 shows an example diagram of generation of metadata from messages. For simplicity, the process of obtaining metadata 860 is discussed for a text message, which does not contain embedded objects, such as images or multimedia. But it should be noted that the process of creating metadata can be performed in analogous manner for messages containing embedded objects, wherein different algorithms can be used to obtain the hash sums, depending on the type of embedded object. From the text message, the text 810, contained in the body of the message, is extracted. The text is divided into fragments 820A-820C, from which the hash sums 830A-830C are then constructed, using known hash functions, such as SHA-1 or MD5. After the process of constructing the hash sums, the IP address of the message sender 850 is added to the hash sums 840, after which the obtained metadata is subjected to a filtering (e.g., signature filtering) before clustering and rating determination.

Particularly, the set of obtained hash sums 830A-830C may contain elements that will introduce a negative effect in the clustering process. These elements may include, but not limited to, hash sums obtained from text fragments often occurring in both legitimate and spam messages and also frequently repeating elements, which may be perceived as being characteristic features of spam. For example, legitimate messages often include signatures of the senders, which indicate the place of work, job title, a link to company website, telephone numbers, and other information. Text elements are often added to the message text that indicate the type of device from which the message was sent (for example, the text "Sent from mobile device"), or the mail resources used to send the message (for example, the name of the mailing service or social network). These elements may occur in messages sent by different users from different IP addresses, and therefore such messages may be incorrectly classified as a spam mailing, even though they are not. Moreover, messages containing identical signatures will have a great degree of similarity and the likelihood of such messages ending up in the same cluster will be higher, regardless of the content of the messages.

To reduce the likelihood of errors caused by the aforementioned features, in one of the aspects, after constructing the set of hash sums, a filtering of the hash sums is performed by the filtering module 340 and the storage 120, which contains known hash sums that should not to be used in the clustering process. In one aspect, it is also possible to additionally perform a filtering of the text at the stage of its being divided to form the hash sums. Besides the signatures, other elements of little informative content that are common to all messages can also be filtered out, such as the salutation text at the start of the messages.

The use of the clustering process makes it possible to group the messages based on degree of similarity into clusters. This grouping of message allows to determine the rating for a cluster, and thus for all the metadata associated therewith, and for the messages corresponding to this metadata. In one example aspect, the cluster rating may be equated to the rating of messages whose metadata is contained in the cluster, which makes is possible to determine whether the message is spam or legitimate.

Figure 9:
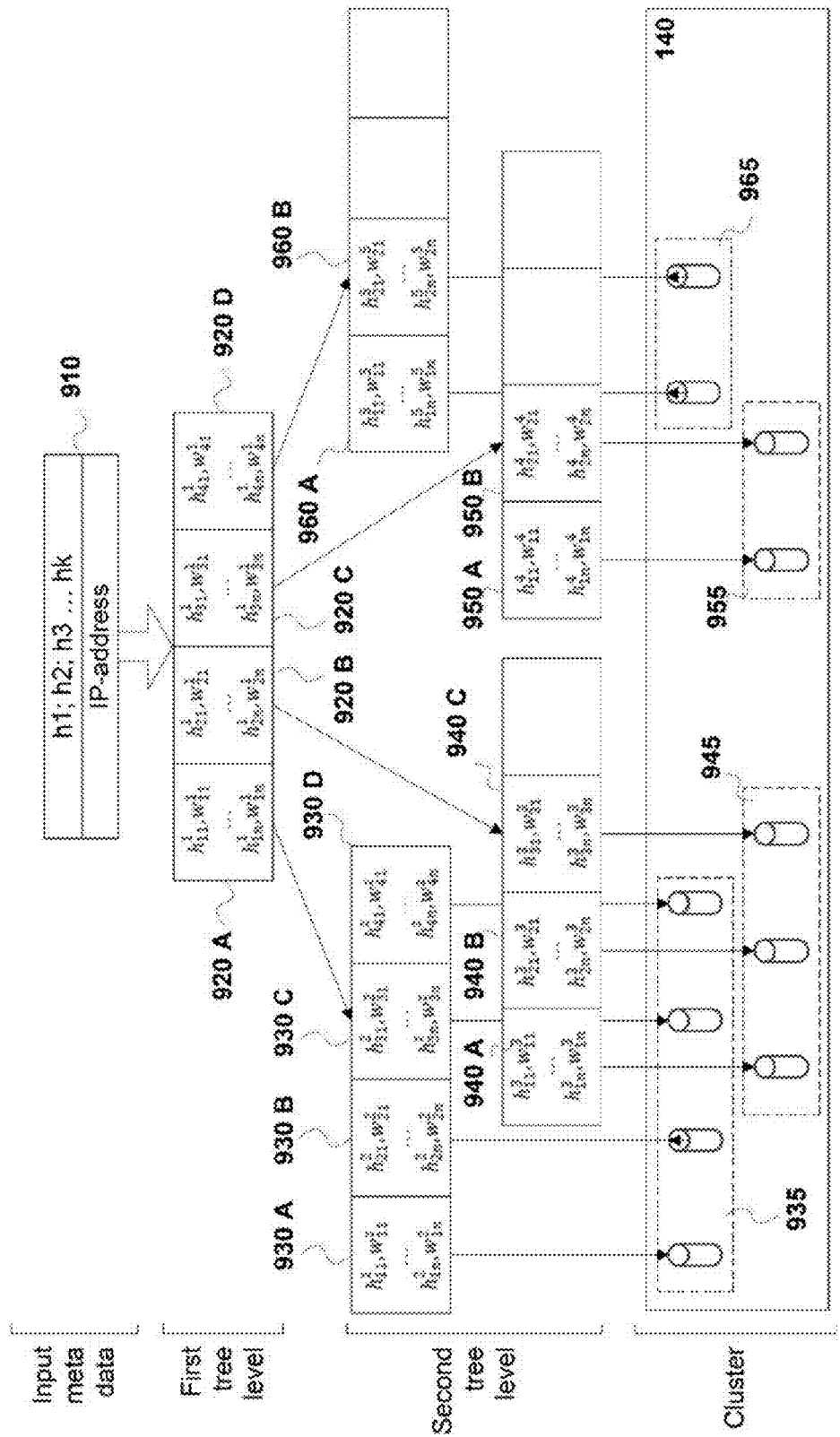
FIG. 9 is a block diagram illustrating an example structure of a cluster index tree in accordance with aspects of the present invention.

FIG. 9 shows an example method for constructing a cluster index tree. The cluster index tree is formed by the clustering module 130, which performs a clustering of arriving metadata 910 consisting of at least a set of hash sums {h1; h2 . . . hk} and an IP address of the message sender, which may be characterized by the set of hash sums {h1; h2 . . . hk}. The cluster tree is used to find the cluster to which the arriving metadata is assigned. In other words, the set of hash sums after passing through the levels of the index tree in the end receives an indicator of the cluster in the cluster storage module 140 where it will be placed.

The cluster tree may be constructed on the basis of the sets of hash sums present in the storage module 140. The tree consists of levels and nodes. FIG. 9 shows two levels: the first level consists of one node, including the sets 920A-920D, the second level consists of four nodes, including the sets 930A-930D, 940A-940C, 950A-950B, 960A-960B. Depending on the number of sets of hash sums in the module 140 and the degree of their similarity, there can be significantly more levels. Each level consists of nodes, each node in turn consists of a fixed number of sets of values (hi, wi). In the tree structure being described, the maximum number of sets of values (hi, wi) for any given node is four, although in the general case their number may be different. The node of the first level consists of the sets 920A, 920B, 920C, 920D. Each set of values (hi, wi) contains n pairs, consisting of the values of the most frequent hash sums hi and weighting factors wi corresponding to the given values; for example, the set of values 920A of the first level consists of the following n pairs: $h_{11}^1$, $w_{11}^1$ . . . $h_{1n}^1$, $w_{1n}^1$. The weighting factors wi are calculated for the corresponding values hi using formula 1:

$$w_i = \frac{c_j}{n},$$

where $c_i$ is the number of times that $h_i$ occurs in the cluster. The inequality will be fulfilled:

$$w_1 \geq w_2 \geq \ldots \geq w_N$$

Thus, the first level is created on the basis of an analysis of all existing hash sums present in the cluster storage module 140, with a selection of the most often occurring hash sums used to form the tree of clusters. Each set of values ($h_i$, $w_i$) contains a reference to the node of the next level or it points directly to a cluster in the storage module 140, if the bottom of the tree has been reached.

The next level consists of analogous nodes, but for this level each set of values 930A-930D, 940A-940C, 950A-950B and 960A-960B is determined not from all the hash sums present in the cluster storage module 140, but only from a portion that includes the group of clusters corresponding to one node or another. For example, for the node containing the sets 930A-930D, the most often occurring values of the hash sums will be determined not from all the hash sums stored in the module 140, but only from the portion 935. Similarly, for the sets 940A-940C, 950A-950B and 960A-960B there will be used the portions 945, 955 and 965 respectively. To determine the sets of values ($h_i$, $w_i$) for each node of all the levels, the algorithm that was described for the first level may be used.

Some nodes may have vacancies which are not filled with sets (hi, wi) at certain moments of time. FIG. 9 shows a tree of clusters in which only one node is filled to the limit on the second level, said node consisting of the sets 930A-930D. Such vacancies may appear, for example, when the tree is not yet filled up or after completing the process of restructuring of the tree. With the arrival of new metadata, the tree will be filled with hash sums and its nodes will be filled up. Thus, each node of the tree consists of sets of values (hi, wi) that contain the most often occurring hash sums hi, but the first level contains the most often occurring hash sums for the entire storage module 140, and the other levels those for the corresponding portions. Therefore, moving downward through the tree of clusters, the set of hash sums which has arrived approaches the most appropriate cluster step by step.

In one example aspect, the appropriate cluster is determined by the degree of similarity between the newly-arrived set of hash sums {h1; h2 . . . hk} from the metadata 910 and the existing sets in the tree of clusters, which is determined using Formula 2:

$$D = \frac{\sum w_j}{k}$$

The sum here is formed over all wj corresponding to the hash sums in the tree of clusters that are matched by hash sums in the arriving set {h1; h2 . . . hk}. The larger the value of D, the more the arriving set corresponds to the cluster. Also, the value of D should be higher than a given threshold value T. The value T is the cluster boundary, it indicates the minimum degree of similarity which the sets of hash sums that are assigned to the cluster should have.

After receiving new metadata, the value of D is calculated for each of the four sets 920A-920D of the node of the first level, after which one such set is determined for which the resulting value of D proved to be the largest and which exceeds the threshold value T, for example, the set 920D. One then moves on to the second level and to that node to which the set 920D refers. Then, in accordance with this move, the D values are calculated for the sets 960A and 960B, and the largest of them is selected that exceeds the threshold value T. In this way, the cluster to which the obtained metadata is assigned and where said data will be placed is determined. If the metadata has not been assigned to any of the existing clusters, a new cluster may be created, and the message to which the metadata corresponds will be regarded as legitimate.

In one aspect, the D value along with the cluster rating can be transferred as a response to the interaction module 250. This value will take part in the analysis conducted by the decision making module 260, and will make it possible to improve the accuracy of determination of spam messages.

After placing the new metadata into clusters in the storage module 140, the total number of identical hash sums occurring in the cluster may change, which in turn entails a change in the weighting factors wi and, as a consequence, a change in the structure of the nodes of the tree. In particular, the nodes of the tree may contain other hash sums, or in another sequence, since the number of these hash sums in the corresponding cluster has changed. Ideally, after adding new metadata to a cluster, the tree of clusters should be updated, but this process entails the need for greater computing resources, since each time it will be necessary to perform the calculation of all the weighting factors wi by Formula 1 all over again. However, in one aspect, a constant updating of the tree of clusters when new metadata is added is not necessary if the new metadata does not make a significant change to the content of the tree. For example, if the clusters contain thousands of sets of hash sums, the adding of one new set will not introduce a significant error, as when the clusters contain dozens of hash sums. In the latter case, the error might be of significant magnitude. Therefore, one can vary the criteria for refreshing the index tree in consideration of the dimensions of the clusters. That is, if the clusters have a small dimension (they contain little data), refreshing of the tree can be done after each entry of a new set of hash sums, and in this case the increased load on the computer system will be slight, due to the small volume of data processed. If the clusters have a large volume, then the tree can be refreshed after receiving a given quantity of new metadata 910, and the quantity can be chosen optimally to reduce the load and at the same time maintain the error due to not updating at a permissible level.

Another situation which may occur in the clustering of metadata with the use of a cluster tree is the failure to exceed the threshold value T when calculating the D value determining the degree of similarity between the incoming set of hash sums {h1; h2 ... hk} from the metadata 910 and the existing sets in the tree of clusters. Such a situation can occur at any level of the tree of clusters. In this respect, it should be noted that, in general, the T value need not necessarily be the same for all elements of the tree: it can differ depending on the level of the tree or even the node.

When this situation arises and the T value is not reached for any set of values (hi, wi) of a given node of the tree, several alternative procedures of the clustering module 130 are possible. If the given node has areas unoccupied by sets (hi, wi), which occurs on the second level of the tree in FIG. 9 for all nodes except the node consisting of the sets 930A-930D, the corresponding free areas will be filled in and participate on an equal footing with those already filled up in the clustering process. In this case, a new cluster will be created in the storage module 140, corresponding to the new set (hi, wi).

Since the number of sets of values (hi, wi) for each node of the tree is bounded and fixed, when all of the sets have been filled and the situation arises where the T value is not reached for any set of values (hi, wi) of the given node of the tree, the tree will be restructured by dividing of the node, which will be described in detail with reference to FIG. 10.

Figure 10:
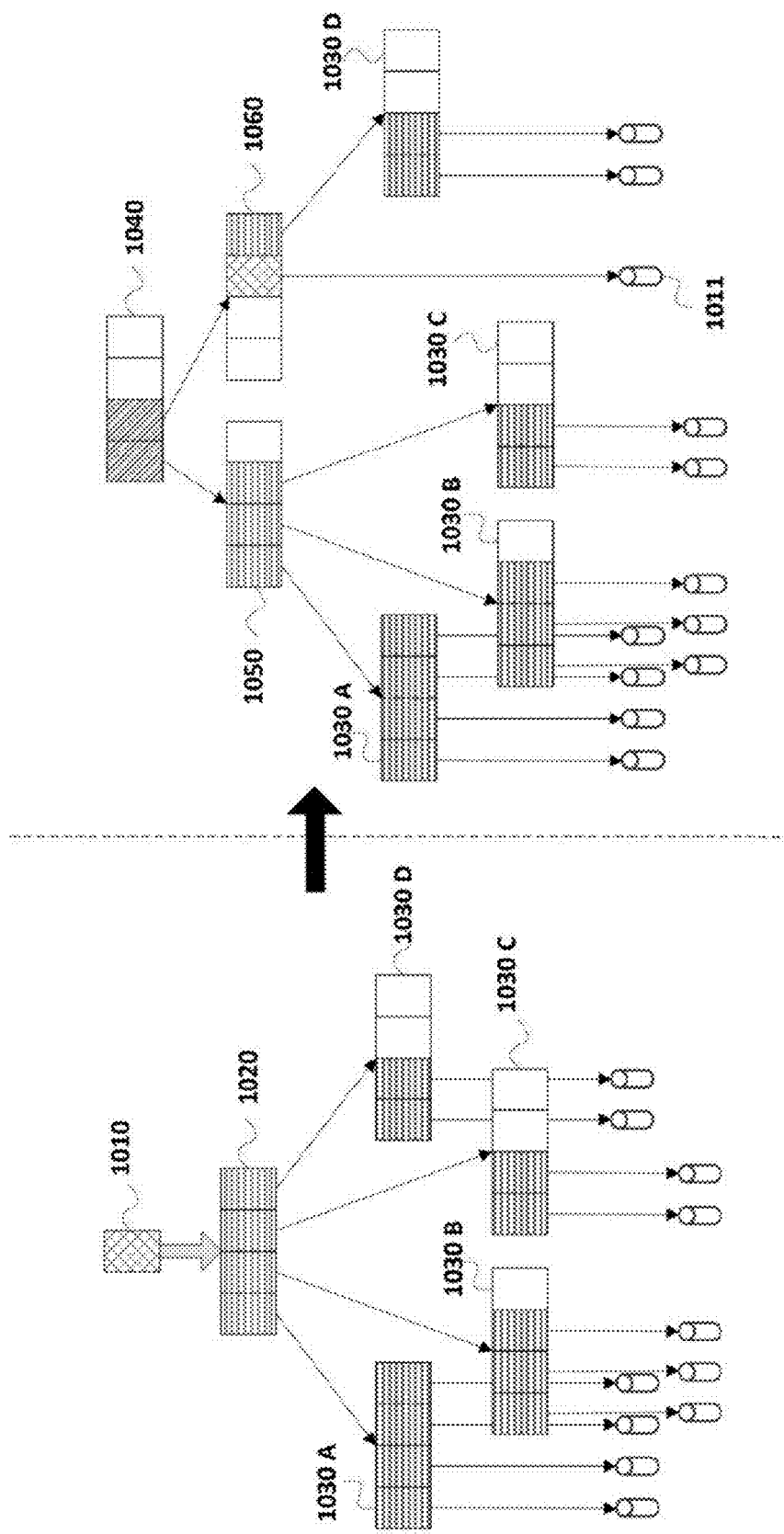
FIG. 10 is a block diagram illustrating an example of restructuring of a cluster index tree in accordance with other aspects of the present invention.

FIG. 10 shows an example process of restructuring of the tree of clusters, in which one node 1020 is divided into two independent nodes 1050 and 1060 with the forming of a new level consisting of the node 1040. FIG. 10 illustrates an example of the dividing of a node of the first level upon arrival of new metadata 1010 containing a set of hash sums for which the calculated D value for each set of values of the node 1020 turns out to be below the established threshold value T. All the areas of the node 1020 have been filled up. For the dividing of the node, at first a new cluster 1011 is created, where the received metadata 1010 will be entered. The set of values (hi, wi) is calculated for the new cluster. After creating the new set of values (hi, wi), the degree of similarity of the new set and the other sets of the node 1020 is calculated using Formula 3:

$$D_c = \frac{2\sum w_k}{|(hi, wi)| + |hj, wj)|}$$

where the summation is done over all weighting factors wk from both sets of values (hi, wi) and (hj, wj) for which there are matching hash sums, and |(hi, wi)| and |(hj, wj)| are the number of elements in the corresponding sets of values. The smaller is $D_c$, the less similar are the sets of values and the corresponding clusters. From the obtained values $D_c$ one determines the least intersecting sets, which are placed in two different nodes 1050 and 1060. The remaining sets are distributed in the obtained nodes of the tree, taking into account the degree of similarity with respect to the distributed least intersecting sets. Thus, from one node 1020 on the first level two nodes are formed—1050 and 1060 on the second level, while a new level is formed, consisting of the node 1040. The sets of values $(h_i, w_i)$ for the new parent node 1040 on the first level can be obtained on the basis of the corresponding values from the nodes 1050 and 1060 by calculation with Formula 1.

The reverse process of unification of nodes or sets of values is also possible in the given model of constructing the tree of clusters. The unification process can be done, for example, in the case of updating a tree of clusters. The unification process is based on a determination of the degree of similarity $D_c$ of the sets of values (hi, wi) and (hj, wj) of one or more nodes in the context of a single level of the tree. The values of $D_c$ are calculated using Formula 3, indicated above. If the resulting values of $D_c$ exceed the established threshold $T_c$, the corresponding sets (hi, wi) and (hj, wj) are close and their corresponding clusters are also close. If the sets (hi, wi) and (hj, wj) are contained within a single node, then they are unified. The resulting unified set of values is recalculated using Formula 1. If the sets (hi, wi) and (hj, wj) are in different nodes, before placing them in any particular node, one may first determine which node the unified set will be closest to. This can also be done using Formula 3, after establishing the closeness to the least similar sets of the two nodes.

Figure 11:
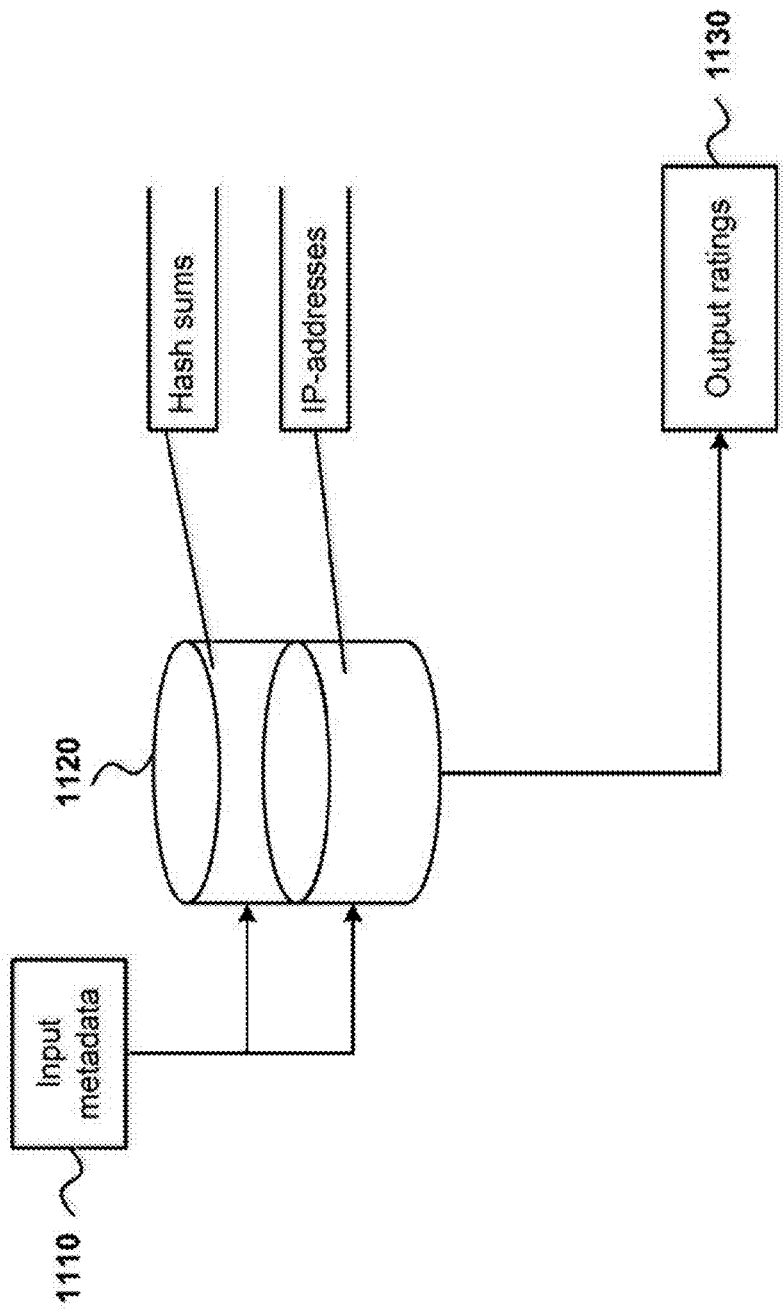
FIG. 11 is a block diagram illustrating an example structure of a message cluster in accordance with aspects of the present invention.

FIG. 11 shows an example structure of a cluster 1120 in the cluster storage module 140. Each cluster contains sets of hash sums and the IP addresses of the senders of messages corresponding to the sets of hash sums. The ratings of the clusters may be kept in the cluster rating module 330 for each cluster. When the cluster generation module 320 determines to which cluster metadata 1110 is assigned, the metadata is entered into the corresponding cluster 1120, that is, the set of hash sums and IP addresses is stored. After this, the rating of the cluster is determined. The rating 1130 is reported as a response to the client mail server 200, which makes a decision as to the message based on the received rating.

The ratings of the clusters may change when new metadata is added to the cluster. The primary criterion used when forming the rating of a cluster is the number of similar sets of hash sums with different IP addresses of the senders. The more similar sets of hash sums obtained from different senders arrive in the cluster, the higher the likelihood that the given cluster contains hash sums pertaining to spam messages, and the rating of the cluster will increase accordingly. A large number of similar hash sums pertaining to a message sent from a single IP address will mean that the given message is not spam, which will be reflected by the appropriate decrease in the rating of the cluster.

The sources from which the messages or the metadata of messages were received can also be considered in the process of changing the ratings of clusters. For example, when clustering messages obtained from message traps, the rating of the cluster to which the metadata of the messages will be assigned will be increased.

In one aspect, a human malware expert may be used in making conclusions as to whether messages are spam before placing the metadata of the messages into clusters. Such conclusions will influence the forming of the rating of the clusters.

Figure 12:
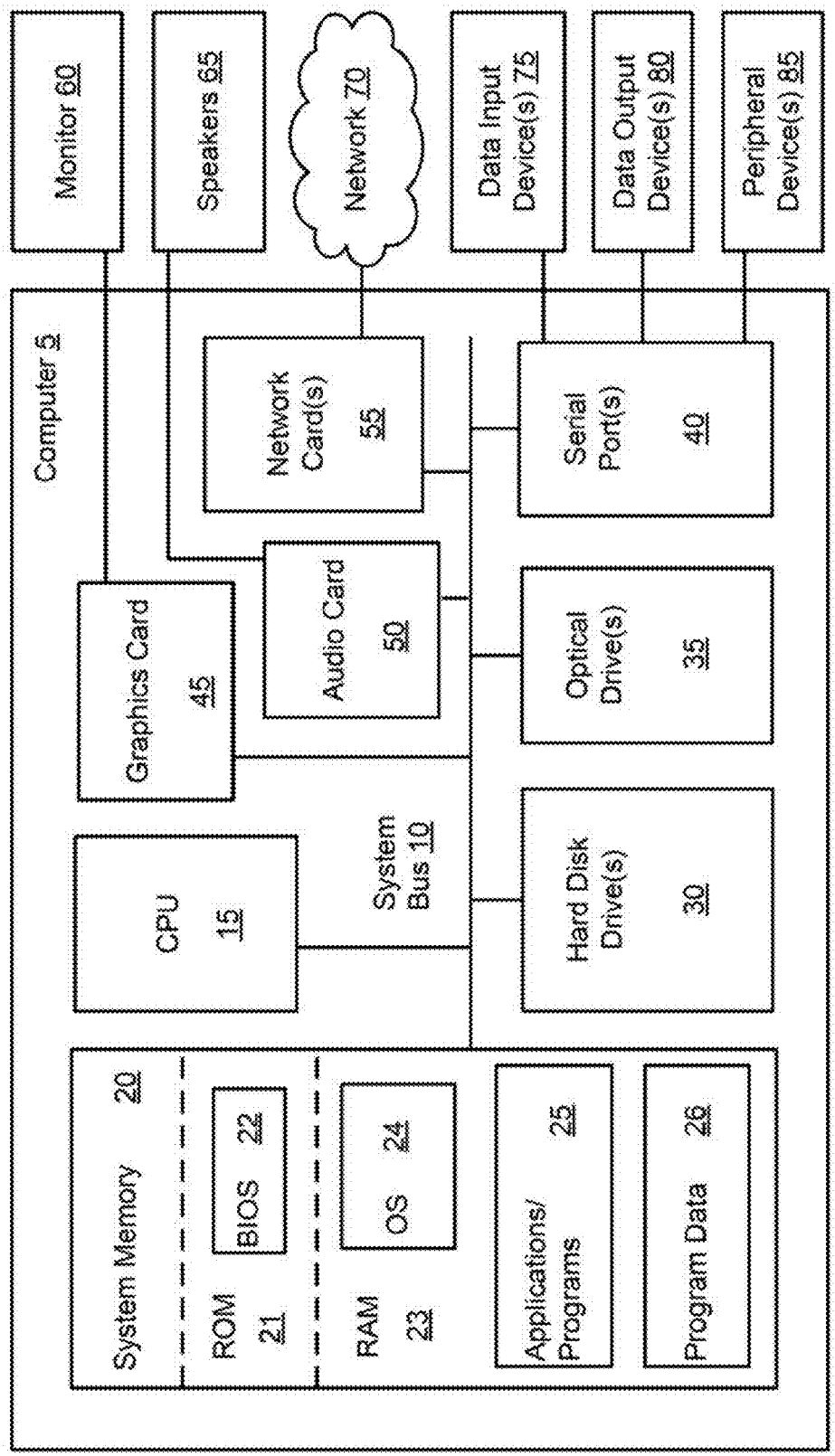
FIG. 12 is a block diagram illustrating an example of a general-purpose computer on which the described systems and methods for detecting and classification of spam can be implemented in accordance with various aspects of the present invention.

FIG. 12 depicts one example aspect of a computer system 5 that can be used to implement the disclosed systems and methods for detection of spam disclosed herein. The computer system 5 may include, but not limited to, a personal computer, a notebook, tablet computer, a smart phone, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 12 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known components referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for detection of spam, the method comprising:
   receiving, by a computer processor, a plurality of electronic messages;
   classifying the received plurality of messages as legitimate or spam messages;
   identifying unknown messages that could not be classified as legitimate or spam;
   obtaining a metadata of the unknown messages, the metadata including at least a hash sum for an unknown message and an address of a sender of the unknown message;
   placing the metadata of the unknown messages into one cluster of a plurality of clusters based on degree of similarity between hash sums of different unknown messages;
   rating each unknown message in accordance with a rating of the cluster where the metadata of the unknown messages was assigned to, wherein the rating of the cluster is based, at least, on a number of similar hash sums of unknown messages received from different addresses of message senders contained in said cluster; and
   classifying unknown messages as legitimate or spam based on message ratings.

2. The method of claim 1, wherein classifying unknown messages as legitimate or spam based on cluster ratings further includes:
   classifying a message as spam when a cluster rating is above a first threshold; and
   classifying a message as legitimate when a cluster rating is below a second threshold.

3. The method of claim 1, wherein:
   the greater is the number of messages in a cluster having similar hash sums and different addresses of message senders, the rating of a cluster indicates that the cluster contains metadata of spam messages; and
   the greater is the number of messages in a cluster with similar hash sums and the same address of the message sender, the rating of said cluster indicates that the cluster contains metadata of legitimate messages.

4. The method of claim 1, wherein receiving a plurality of messages includes:
   receiving the plurality of messages from one or more message traps; and
   when a message is received from a message trap, modifying the rating of a cluster to which said message was assigned to indicate that the cluster contains metadata of spam messages.

5. The method of claim 1, wherein placing the metadata of the unknown messages into a plurality of clusters includes:
   placing the metadata of the unknown messages into a plurality of clusters using a cluster tree, in which each node of the cluster tree identifies hash sums common to a plurality of legitimate messages or spam messages.

6. The method of claim 1, wherein obtaining a metadata of the unknown messages further includes:
   separating each unknown message into a plurality of fragments;
   computing hash sums of each of the plurality of message fragments;
   identifying an address of the message sender; and
   filtering the metadata by removing hash sums of message fragments common to a plurality of messages.

7. The method of claim 2, wherein, when the cluster rating is between the first and second thresholds, placing the messages in said cluster in quarantine for a period of time or until cluster rating changes above the first threshold or below the second threshold.

8. A computer system for detection of spam, comprising:
   a processor configured to:
     receive a plurality of electronic messages;
     classify the received plurality of messages as legitimate or spam messages;
     identify unknown messages that could not be classified as legitimate or spam;
     obtain a metadata of the unknown messages, the metadata including at least a hash sum for an unknown message and an address of a sender of the unknown message;
     place the metadata of the unknown messages into one cluster of a plurality of clusters based on degree of similarity between hash sums of different unknown messages;
     rate each unknown message in accordance with a rating of the cluster where the metadata of the unknown messages was assigned to, wherein the rating of the cluster is based, at least, on a number of similar hash sums of unknown messages received from different addresses of message senders contained in said cluster; and
     classify unknown messages as legitimate or spam based on message ratings.

9. The system of claim 8, wherein to classify unknown messages as legitimate or spam based on cluster ratings, the processor further configured to:
   classify a message as spam when a cluster rating is above a first threshold; and
   classify a cluster as legitimate when a cluster rating is below a second threshold.

10. The system of claim 8, wherein:
    the greater is the number of messages in a cluster with similar hash sums and different addresses of message senders, the rating of a cluster indicates that the cluster contains metadata of spam messages; and
    the greater is the number of messages in a cluster with similar hash sums and the same address of the message sender, the rating of said cluster indicates that the cluster contains metadata of legitimate messages.

11. The system of claim 8, wherein to receive a plurality of messages, the processor further configured to:

receive the plurality of messages from one or more message traps; and when a message is received from a message trap, modify the rating of a cluster to which said message was assigned to indicate that the cluster contains metadata of spam messages.

12. The system of claim 8, wherein to place the metadata of the unknown messages into a plurality of clusters, the processor further configured to:

place the metadata of the unknown messages into a plurality of clusters using a cluster tree, in which each node of the cluster tree identifies hash sums common to a plurality of legitimate messages or spam messages.

13. The system of claim 8, wherein to obtain a metadata of the unknown messages, the processor further configured to:

separate each unknown message into a plurality of fragments;

compute hash sums of each of the plurality of message fragments;

identify an address of the message sender; and filter the metadata by removing hash sums of message fragments common to a plurality of messages.

14. The system of claim 8, wherein, when the cluster rating is between the first and second thresholds, the processor further configured to place the messages in said cluster in quarantine for a period of time or until cluster rating changes above the first threshold or below the second threshold.

15. A computer program product stored in a non-transitory computer-readable storage medium, the computer program product comprising computer-executable instructions for detection of spam, including instructions for:

receiving a plurality of electronic messages;

classifying the received plurality of messages as legitimate or spam messages;

identifying unknown messages that could not be classified as legitimate or spam;

obtaining a metadata of the unknown messages, the metadata including at least a hash sum for an unknown message and an address of a sender of the unknown message;

placing the metadata of the unknown messages into one cluster of a plurality of clusters based on degree of similarity between hash sums of different unknown messages;

rating each unknown message in accordance with a rating of the cluster where the metadata of the unknown messages was assigned to, wherein the rating of the cluster is based, at least, on a number of similar hash sums of unknown messages received from different addresses of message senders contained in said cluster; and classifying unknown messages as legitimate or spam based on message ratings.

16. The product of claim 15, wherein instructions for classifying unknown messages as legitimate or spam based on cluster ratings, further include instructions for:

classifying a message as spam when a cluster rating is above a first threshold; and classifying a cluster as legitimate when a cluster rating is below a second threshold.

17. The product of claim 15, wherein:

the greater is the number of messages in a cluster with similar hash sums and different addresses of message senders, the rating of a cluster indicates that the cluster contains metadata of spam messages; and the greater is the number of messages in a cluster with similar hash sums and the same address of the message sender, the rating of said cluster indicates that the cluster contains metadata of legitimate messages.

18. The product of claim 15, wherein instructions for receiving a plurality of messages further include instructions for:

receiving the plurality of messages from one or more message traps; and when a message is received from a message trap, modifying the rating of a cluster to which said message was assigned to indicate that the cluster contains metadata of spam messages.

19. The product of claim 15, wherein instructions for placing the metadata of the unknown messages into a plurality of clusters further include instructions for:

placing the metadata of the unknown messages into a plurality of clusters using a cluster tree, in which each node of the cluster tree identifies hash sums common to a plurality of legitimate messages or spam messages.

20. The product of claim 15, wherein instructions for obtaining a metadata of the unknown messages further include instructions for:

separating each unknown message into a plurality of fragments;

computing hash sums of each of the plurality of message fragments;

identifying an address of the message sender; and filtering the metadata by removing hash sums of message fragments common to a plurality of messages.

\* \* \* \* \*

UNITED STATES PATENT AND TRADEMARK OFFICE
CERTIFICATE OF CORRECTION

| | | |
|---|---|---|
| PATENT NO. | : 8,738,721 B1 | Page 1 of 1 |
| APPLICATION NO. | : 14/069472 | |
| DATED | : May 27, 2014 | |
| INVENTOR(S) | : Evgeny P. Smirnov et al. | |

It is certified that error appears in the above-identified patent and that said Letters Patent is hereby corrected as shown below:

Title Page

Item (72) Inventors:

~~Evgeny P. Smirnov, Moscow (RU); Andrey V. Bakhmutov, Moscow (RU); Sarya V. Loseva, Moscow (RU); Dmitry A. Shvyrkov, Moscow (RU)~~ should read as:

Item (72) Inventors:

Evgeny P. Smirnov, Moscow (RU); Andrey V. Bakhmutov, Moscow (RU); Darya V. Loseva, Moscow (RU); Dmitry A. Shvyrkov, Moscow (RU)

Signed and Sealed this
Ninth Day of September, 2014

Michelle K. Lee
*Deputy Director of the United States Patent and Trademark Office*